(12) United States Patent
Nilsson et al.

(10) Patent No.: US 11,317,603 B2
(45) Date of Patent: May 3, 2022

(54) MILKING STABLE

(71) Applicant: DELAVAL HOLDING AB, Tumba (SE)

(72) Inventors: Björn Nilsson, Tumba (SE); David Gräns, Tumba (SE)

(73) Assignee: DeLaval Holding AB, Tumba (SE)

( * ) Notice: Subject to any disclaimer, the term of this patent is extended or adjusted under 35 U.S.C. 154(b) by 133 days.

(21) Appl. No.: 16/463,962

(22) PCT Filed: Nov. 23, 2017

(86) PCT No.: PCT/SE2017/051162
§ 371 (c)(1),
(2) Date: May 24, 2019

(87) PCT Pub. No.: WO2018/097791
PCT Pub. Date: May 31, 2018

(65) Prior Publication Data
US 2020/0375145 A1 Dec. 3, 2020

(30) Foreign Application Priority Data
Nov. 24, 2016 (SE) .................................... 1651536-3

(51) Int. Cl.
*A01K 1/12* (2006.01)
*A01J 5/017* (2006.01)

(52) U.S. Cl.
CPC ................. *A01K 1/12* (2013.01); *A01J 5/017* (2013.01)

(58) Field of Classification Search
CPC .. A01K 1/0017; A01K 1/0029; A01K 1/0613; A01K 1/12
See application file for complete search history.

(56) References Cited

U.S. PATENT DOCUMENTS

| 425,649 A | 4/1890 | Bidwell |
| 2,587,846 A * | 3/1952 | Hodsdon .................. A01K 1/12 |
| | | 119/520 |
| 2,714,367 A | 8/1955 | Arnold |

(Continued)

FOREIGN PATENT DOCUMENTS

| AU | 2011200381 A1 | 8/2011 |
| BE | 897346 A | 11/1983 |

(Continued)

OTHER PUBLICATIONS

International Search Report, dated Mar. 9, 2018, from corresponding PCT application No. PCT/SE2017/051162.

(Continued)

*Primary Examiner* — Joshua D Huson
*Assistant Examiner* — Megan J Moroney
(74) *Attorney, Agent, or Firm* — Nixon & Vanderhye

(57) ABSTRACT

A milking stable configured to house one animal at a time for milking the animal, with a first long side wall, a second long side wall located opposite to the first long side wall, a first short end wall and an opposite second short end wall, an entrance door hingedly connected to the second long side, and an exit door hingedly connected to the second long side wall, wherein the second long side wall is displaceable in a direction towards and away from the first long side wall so as to change the size of the milking stable to accommodate animals of different size.

12 Claims, 1 Drawing Sheet

(56) References Cited

U.S. PATENT DOCUMENTS

| | | | |
|---|---|---|---|
| 3,421,478 A | 1/1969 | Warmerdam | |
| 3,448,725 A | 6/1969 | Holm et al. | |
| 3,520,516 A * | 7/1970 | Webster | A01K 1/0029 |
| | | | 256/26 |
| 3,760,768 A * | 9/1973 | Patterson | A61D 3/00 |
| | | | 119/473 |
| 4,010,714 A | 3/1977 | Notsuki et al. | |
| 4,201,157 A * | 5/1980 | Lambert | A01K 1/0613 |
| | | | 119/512 |
| 4,524,676 A * | 6/1985 | Rogers | F15B 15/261 |
| | | | 91/43 |
| 4,753,194 A | 6/1988 | Kuip | |
| 5,233,939 A * | 8/1993 | Randolph | A01K 1/0613 |
| | | | 119/473 |
| 5,441,016 A * | 8/1995 | Ricketts | A01K 1/0613 |
| | | | 119/723 |
| 5,469,808 A | 11/1995 | Street et al. | |
| 5,553,569 A | 9/1996 | Street et al. | |
| 5,950,566 A * | 9/1999 | Ricketts | A01K 1/031 |
| | | | 119/473 |
| 6,357,395 B1 * | 3/2002 | Nilsson | A01K 1/0017 |
| | | | 119/524 |
| 7,421,977 B2 * | 9/2008 | Van Den Berg | A01K 1/0017 |
| | | | 119/520 |
| 8,210,128 B1 * | 7/2012 | Lato | A01K 1/0017 |
| | | | 119/510 |
| 9,320,261 B2 * | 4/2016 | Axelson | A01K 1/126 |
| 10,765,085 B1 * | 9/2020 | Studebaker, Jr. | A01K 1/0613 |
| 2003/0150388 A1 * | 8/2003 | Birk | A01K 29/005 |
| | | | 119/14.02 |
| 2005/0223998 A1 * | 10/2005 | Bosma | A01J 7/04 |
| | | | 119/14.18 |
| 2006/0231036 A1 * | 10/2006 | Berg | A01K 1/0017 |
| | | | 119/14.08 |
| 2010/0012039 A1 | 1/2010 | Hallstroem | |
| 2013/0036975 A1 * | 2/2013 | Carlsson | A01J 5/01 |
| | | | 119/14.08 |
| 2015/0342139 A1 * | 12/2015 | Saville | A01J 5/017 |
| | | | 119/14.08 |
| 2016/0057972 A1 * | 3/2016 | Sjolund | A01K 1/12 |
| | | | 119/14.03 |
| 2016/0192618 A1 * | 7/2016 | Punt | A01K 1/0613 |
| | | | 119/729 |
| 2016/0262337 A1 * | 9/2016 | Lancaster | A01K 15/04 |

FOREIGN PATENT DOCUMENTS

| | | |
|---|---|---|
| CN | 203457617 U | 3/2014 |
| CN | 203896964 U | 10/2014 |
| CN | 203985455 U | 12/2014 |
| CN | 204305787 U | 5/2015 |
| DE | 10 2005 053 570 A1 | 5/2007 |
| EP | 0 580 220 A1 | 1/1994 |
| EP | 1 197 141 A1 | 4/2002 |
| JP | H01-121354 U | 8/1989 |
| WO | 92/06588 A1 | 4/1992 |

OTHER PUBLICATIONS

Swedish Search Report, dated Aug. 15, 2017, from corresponding SE application No. 1651536-3.

* cited by examiner

MILKING STABLE

TECHNICAL FIELD

The present invention relates to a milking stable configured to house one animal at a time, for milking of the animal, in particular for automatic milking of the animal, said milking stable comprising a first long side wall element, a second long side wall element located opposite to the first long side wall element, a first short end wall element and an opposite second short end wall element, an entrance door hingedly connected to the second long side element, and an exit door hingedly connected to the second long side wall element.

Typically, but not necessarily, the stable comprises a device for automatic milking of animals, wherein said device comprises at least one teat cup and means for detection of the position of a teat of an animal positioned inside the stable, and means for displacing the teat cup from an inactive position to an active position in which it is attached to said teat. Typically, the milking stable is configured to receive one animal at a time and to present a space that restricts the possibility of movement of the animal inside said stable, in order to enable efficient and reliable operation of the device for automatic milking.

BACKGROUND ART

Milking of animals, in particular cows, at an industrial scale often includes the use of a milking stable equipped with a device for automatic milking of the animals, wherein said device for automatic milking comprises at least one teat cup and means for detection of the position of a teat of an animal positioned inside the stable, and means for displacing the teat cup from an inactive position to an active position in which the teat cup is attached to said teat.

The milking stable is configured to receive an animal entering the stable and to perform the automatic milking of one animal at a time. In order to facilitate the finding of the animal's teats for the device for automatic milking, the size of the stable is restricted such that the animal has a rather limited area to stay in inside the stable, thereby restricting the animal's possibility of moving around inside the stable. At a short end wall of the stable, there is often provided a food manger. The provision of the food manger helps to ensure that the animal will stand in the stable in a predetermined direction, with its head turned towards the food manger. The food manger may also be displaceable in the longitudinal direction of the stable in order to further affect and control the position of the animal inside the stable in said longitudinal direction. Thereby, regard may be taken to the length of an individual animal such that the teats of that animal will be in a region in which they can be detected by and reached by the device for automatic milking of the animal. The device for automatic milking often has a predetermined position and a restricted reach area in said longitudinal direction, and therefore the right positioning of the individual animal, with regard to the length of the animal, inside the stable is vital for a successful milking operation.

Animals to be milked inside the stable may not only be of different length, They may also be of different width. In fact, for different cow breeds, the difference in size may be so large that a stable adapted for housing one cow at a time of a large-sized breed, like Holstein cows, may house two cows of a small-size breed, like Jersey cows. There may also be large size differences within a breed and within one and the same herd. This would imply that stables of different sizes should be designed and manufactured for different breeds or animals of different sizes. However in order to keep manufacturing costs and maintenance costs down, manufacturers of milking stables try to design the stables such that one stable size will still fit all breeds. One way of doing so is by arranging the entrance door and the exit door in a V-formation, wherein said doors are hingedly attached to a respective end of a long side wall, wherein the long side wall to which the doors are attached is much shorter than the opposite long side wall and positioned such that the doors, when in an open position, will extend away from the respective short end wall while forming a V-like structure together with the long side wall element to which they are attached. When the doors are closed they will, to a certain extent, force an animal that has entered the stable to move in a lateral direction towards the opposite long side wall. Thus, also individual animals of small size will to a certain degree be forced into a position in which the animal is within reach of the device for automatic milking in a lateral direction of the milking stable. However, this solution is not fully satisfying, and the applicant has realised that, with a milking stable adapted for entrance of a very large animal, there is a risk that two small animals will be able of entering the milking stable simultaneously. In such a case, there is a large risk that the two animals will affect each other's position such that none of them will be able of being milked by the automatic milking device while staying inside the stable. Alternatively, if only one very small animal enters the stable, that animal will have lots of space and may find itself without reach of the automatic milking device. Such risks should be avoided.

It is therefore an object of the invention present an alternative milking stable that promotes a correct positioning of an animal inside the milking stable in a lateral direction of the milking stable with regard taken to the size, or more precisely the width, of the animal and with regard to the position and reach area of a device for automatic milking that is either part of the milking stable or additional equipment provided at the milking stable.

SUMMARY OF THE INVENTION

The object of the invention is achieved by means of the initially defined milking stable, which is characterised in that the second long side wall element is displaceable in a direction towards and away from the first long side wall element. Thereby, the width of the stable becomes adjustable and can be adjusted on basis of sizes between breeds or between individual animals.

According to one embodiment, the milking stable comprises a bridge element that connects the first long side wall element with the second long side wall element, wherein the length of said bridge element between said first long side wall element and said second long side wall element is adjustable. The bridge element will contribute to improved stability of the first and second long side wall elements, while at the same time defining a distance therebetween that can be adjusted by adjustment of the bridge element. The bridge element may, but need not necessarily, be of a telescopic type. The bridge element may be configured to be manually length-adjusted or to be length-adjusted by means of any suitable power device.

According to one embodiment the bridge element comprises a first part connected to the first long side wall element, and a second part connected the second long side wall element, wherein there is provided a locking mechanism which in an unlocked state permits displacement of the second part relative to the first part in said direction towards and away from the first long side wall element and which in a locked state connects said first and second parts and prevents such displacement. The locking mechanism may be a clamping mechanism, a bolt that is to be inserted into lateral through holes in the interconnected parts, or any other suitable locking mechanism that may be either manually or automatically activated and inactivated.

According to one embodiment said first and second parts of the bridge element have at least two predetermined positions which result in different length of the bridge and in which the locking mechanism can be set in its locking state. For example, if the interconnected first and second parts of the bridge are provided with through holes for the insertion of a bolt or the like for the purpose of interlocking the parts, such through holes should be provided at least at two different positions on at least one of said first and second parts, as seen in the longitudinal direction thereof.

According to one embodiment said milking stable comprises a driving mechanism that is configured to displace said second part relative to said first part in order to change the length of the bridge. Such a driving mechanism may comprise any suitable mechanism, such as an electric motor and a rack, a pneumatic cylinder-piston device or a hydraulic cylinder-piston device. According to one embodiment, that will configure great stability to the stable, and that will enable continual length-adjustment of the bridge, the bridge comprises two parallel hydraulic cylinder-piston devices.

According to one embodiment, said milking stable comprises a system configured to identify the size, primarily the width, of an animal in the stable, wherein said driving mechanism is connected to the identification system and an associated data base holding a record of the animal, including size measures of the animal, and wherein the driving mechanism configured to change the length of the bridge element on basis of information from the identification system of the size (here width) of an animal that enters the stable. The identification system may comprise a camera that captures a picture of the animal that is in the stable or is on its way into the stable, and a control unit that, on basis of the information an said picture, decides to which extent the length of the bridge element is to be changed and controls said driving mechanism. As an alternative, said system may comprise a reader device able of reading an identification tag or the like carried by the animal, wherein the control unit is connected to the reader device and controls the driving mechanism on basis of the information regarding the animals width on said identification tag or the like. The camera or reader may be positioned at any suitable place in or on the milking stable. The control unit may be a remote control unit, connected by wire or wirelessly to the driving mechanism, the camera and/or the reader. Alternatively, the control unit is an integrated part of any of said components. The provision of the identification system enables individual adjustment of the distance between the first and second long side wall elements for individual animals.

According to one embodiment, the bridge element is positioned above the expected height of animals to be milked in the stable. Thereby, the risk of the animals interfering with the functionality of the bridge element is prevented. Preferably, the bridge element is positioned a predetermined distance above the height of the largest expected animal to enter the stable. According to one embodiment, the bridge element is provided on top of, or at a top level of, the first and second long side wall elements.

According to one embodiment, the milking stable comprises engagement means for disengagement and engagement of a bottom part of the second long side wall element from and to a ground on which the second long side wall element stands. "Engagement" is here referred to as locking the long side wall element in position relative the underlying ground and thereby preventing displacement of the long side wall element. The engagement means may comprise feet provided at the bottom of the second long side wall element, wherein said feet are configured to be displaced in relation to said wall element in a vertical direction by means of screwing. Alternatively, the engagement means may comprise one or more spring-loaded elements that engages the underlying ground by the action of a spring, and which can be disengaged from the ground by manual or automatic counteraction of the spring force. Other solutions are of course also feasible, such as bolts or the like to be forced into the underlying ground, possibly in prearranged holes or grooves therein. The engagement means are to be disengaged from the underlying ground when the second long side wall element is displaced towards or away from the opposite first long side wall element, and engaged with the ground when the displacement is ended. The underlying ground on which the second long side wall element is to be displaced may comprise a base element, for example a concrete or metal plate which may be configured for engagement with said engagement means. For example, there may be provided holes or grooves in the base element which the engagement means are configured to engage. The engagement means may be covered by a casing or the like in order to prevent ambient dirt from affecting the functionality of the engagement means. If holes or grooves aimed for engagement with the engagement means are provided in the ground, or a base element provided thereon, the casing shall have a length in the lateral direction of the stable that ensures that said holes or grooves are covered by the casing irrespective of the adjusted position of the second long side wall element.

According to one embodiment, the milking stable comprises a second driving mechanism which is configured to control the operation of said engagement means and which is connected to the first driving mechanism for displacement of said second part relative to said first part for change of the length of the bridge, wherein the second driving mechanism is configured to control the operation of said engagement means on basis of information regarding which action is taken by the first driving mechanism. Thereby, a fully automatic adjustment of the position of the second long side wall element can be achieved. The second driving mechanism may be any power mechanism, such as an electric motor, or a pneumatically or hydraulically driven mechanism, the operation of which is controlled by a control unit, preferably the same control unit that is used for controlling the operation of the first driving mechanism.

According to one embodiment the second driving mechanism is configured to set the engagement means in a disengaged position (relative to the underlying ground) when the first driving mechanism performs a change of length of the bridge, thereby allowing displacement of a bottom part of the second long side wall element in correspondence to the change of length of the bridge; and to set the engagement means in an engaged position when the first driving mechanism has finished its change of length of the bridge.

According to one embodiment the first long side wall element forms a support structure which is permanently secured to ground, and the second long side wall element is a movable module which is mechanically supported by the first long side wall element.

According to one embodiment, the second long side wall element is supported by the first long side wall element through the bridge. There may be further support elements between the first long side wall element and the second long side wall element. Such further support elements are then configured to allow the adjustment of distance between the first long side wall element and the second long side wall element. Accordingly, such further support elements may be of telescopic type and/or be arranged to take different angles between the first and second wall elements depending on the distance therebetween. For example, such elements could be slidably connected to one of said wall elements and hingedly connected to the other wall element for that purpose. The short side walls may also be connected to such further support elements and may themselves define modules that are connected to and supported by the first long side wall element or that are self-supporting.

According to one embodiment, the milking stable comprises a power cylinder which in a first end thereof is connected to the first long side wall element and in another end thereof is connected to one of the entrance door or the exit door, and which is configured to control the position of the entrance door or exit door. Preferably, the power cylinder is attached to the door a significant distance away from the end of the door that is attached to the second long side wall element. Thereby, a favourable torque is achieved and less power is needed to swing the door from an open to a closed position and vice versa. As an alternative to being connected to the first long side wall element itself, said power cylinder may be connected to a part of the bridge element that is not moveable in relation to the first long side wall element.

According to one embodiment, the power cylinder which is connected to the first long side wall element (or, alternatively, said part of the bridge element) and one of said entrance door and exit door is a hydraulic cylinder or at least two pneumatic cylinders in series. A solution with only one pneumatic cylinder would result in poor ability of maintaining the required ability of opening and closing the door for different distances between the first long side wall element and the second long side wall element. This is due to the fact a pneumatic piston-cylinder unit only will have two operative positions (fully retracted or fully extended). By either arranging at least two pneumatic cylinders (cylinder-piston units) in series this problem can be overcome to a certain extent. By providing a hydraulic cylinder (cylinder-piston unit) instead of pneumatic cylinders, full freedom of length adjustment thereof can be obtained, and the degree of opening (and closing) of the door can be maintained and precisely controlled for different positions of the second long side wall element.

According to one embodiment, the milking stable comprises a device for automatic milking of animals, wherein said device comprises at least one teat cup and means for detection of the position of a teat of an animal positioned inside the stable, and means for displacing the teat cup from an inactive position to an active position in which it is attached to said teat. The means for detecting the teat as well as the means for displacing the teat cup may be any one of those means that are used on the market today for that purpose, or further developments thereof. The means for detection of the teat has a delimited reach area (both in the longitudinal and the lateral direction of the stable). The same goes for the means for displacing the teat cup. Therefore, a milking stable equipped with such means for detection of a teat and displacement of a teat cup will gain functionality if provided with the movable second long side wall element as disclosed hereinabove and hereinafter, that will restrict the space for a specific animal in the milking stable in the lateral direction of the latter.

Further features of and advantages of the present invention will be presented in the following detailed description.

DETAILED DESCRIPTION

Figure 1:
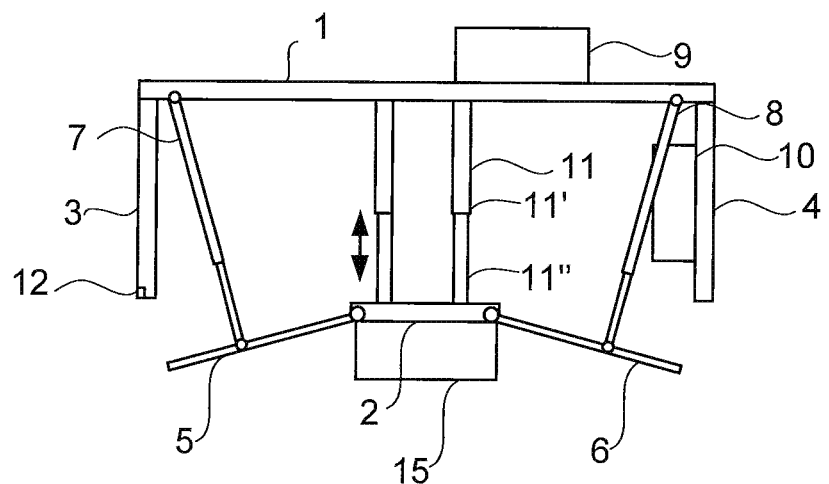
FIG. 1 is a schematic representation of a milking stable according to one embodiment of the present invention, as seen from above
Figure 2:
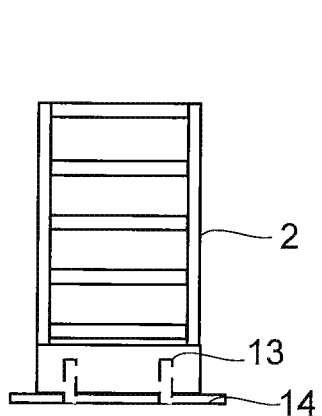
FIG. 2 is a schematic front view of a second long side wall element of the milking stable shown in FIG. 1.

FIG. 1 is a schematic representation of a milking stable according to one embodiment of the invention. The milking stable is configured to house one animal at a time, for milking of the animal, in particular for automatic milking of the animal, said milking stable comprising a first long side wall element 1, a second long side wall element 2 located opposite to the first long side wall element 1, a first short end wall element 3 and an opposite second short end wall element 4, an entrance door 5 hingedly connected to the second long side element 2, and an exit door 6 hingedly connected to the second long side wall element 2.

The first long side wall element 1 forms a support structure which is permanently secured to ground, and the second long side wall element 2 is a movable module which is mechanically supported by the first long side wall element 1. Also the first short end wall element 3 and the second short end wall element 4 are modules, preferably movable modules, that may be supported by the first long side wall element 1 or may be self-supporting modules.

The milking stable comprises a first power cylinder 7 which in a first end thereof is connected to the first long side wall element 1 and in another end thereof is connected to the entrance door 5, and which is configured to control the position of the entrance door 5. The power cylinder 7 is attached to the door 5 more than half the door-length away from the end of the door 5 that is attached to the second long side wall element 2. There is also a second power cylinder 8 which in a first end thereof is connected to the first long side wall element 1 and in another end thereof is connected to the exit door 6, and which is configured to control the position of the exit door 6. The second power cylinder 8 is attached to the exit door 6 more than half the door-length away from the end of the door 6 that is attached to the second long side wall element 2. The exit door 6 is opened by the action of the second power cylinder 8 when an animal inside the stable pushes the door 6 or as a response to a milking operation being finished. The entrance door 5 is opened by the action of the first power cylinder 7 as a response to the opening of the exit door 6, thereby allowing another animal to enter the stable as one animal leaves the latter. The opening and closing sequence, and how opening and closure of the entrance and exit doors 5, 6 is triggered, is not new but well known prior art that is applied. The power cylinders 7, 8 in the shown embodiment are hydraulic power cylinders, i.e. hydraulic cylinder-piston units, though pneumatic cylinders are also conceivable. They are positioned above an expected maximum height of the animals that are expected to enter the stable.

The milking stable comprises a device 9 for automatic milking of animals, wherein said device 9 comprises at least one teat cup and means for detection of the position of a teat of an animal positioned inside the stable, and means for displacing the teat cup from an inactive position to an active position in which it is attached to said teat. Said device 9 is known per se and it is only schematically shown in FIG. 1. The means for detecting the teat as well as the means for displacing the teat cup may be any one of those means that are used on the market today for that purpose, or further developments thereof.

At the second short end wall element 4 of the stable, there is provided a food manger 10. The provision of the food manger 10 helps to ensure that the animal will stand in the stable in a predetermined direction, with its head turned towards the food manger. The food manger 10 is displaceable in the longitudinal direction of the stable in order to further affect and control the position of an animal inside the stable in said longitudinal direction, Thereby, regard may be taken to the length of an individual animal such that the teats of that animal will be in a region in which they can be detected by and reached by the device 9 for automatic milking of the animal. Preferably, there is provided means (not shown in the drawing) for displacement of the food manger 10 in said longitudinal direction based on an indirect or direct identification of the length of an animal that has entered or is to enter the milking stable. The means for displacement may include an electric motor, a pneumatic power cylinder, a hydraulic power cylinder or the like.

The milking stable further comprises a bridge element 11 that connects the first long side wall element 1 with the second long side wall element 2, wherein the length of said bridge element 11 between said first long side wall element 1 and said second long side wall element 2 is adjustable. In the embodiment shown the bridge element comprises a first part 11' connected to the first long side wall element 1, and a second part 11" connected the second long side wall element 2, and there is provided a locking mechanism which in an unlocked state permits displacement of the second part 11" relative to the first part 11' in said direction towards and away from the first long side wall element and which in a locked state connects said first and second parts 11', 11" and prevents such displacement. The locking mechanism may be a clamping mechanism, a bolt that is to be inserted into lateral through holes in the interconnected parts, or any other suitable locking mechanism that may be either manually or automatically activated and inactivated. In the embodiment shown, the locking mechanism function is provided by a driving mechanism that is configured to displace said second part relative to said first part in order to change the length of the bridge. Here, the driving mechanism comprises a pair of parallel hydraulic cylinder-piston devices, which together define the bridge element 11.

The milking stable further comprises a identification system 12 configured to identify the size of an animal in the stable, wherein said driving mechanism for adjusting the length of the bridge element 11 is connected to said identification system 12 and configured to change the length of the bridge element 11 on basis of information from the identification system 12 of the size of an animal that has entered the stable. The identification system 12 may be associated with a camera that captures a picture of the animal that is in the stable or is on its way into the stable, and a control unit (not shown) that, on basis of the information on said picture, decides to which extent the length of the bridge element 11 is to be changed and controls said driving mechanism for execution of said length change. Preferably, the identification system 12 is also used for identifying the length of the animal, while the control unit also controls the operation of the means for displacement of the food manger 10 on basis of the information regarding the animal's length. The control unit may be a remote control unit, connected by wire or wirelessly to the driving mechanism and to the camera. Alternatively, the control unit is an integrated part of any of said components. The provision of the identification system 12 enables individual adjustment of the distance between the first and second long side wall elements 1, 2 for individual animals.

The milking stable comprises engagement means 13 for disengagement and engagement of a bottom part of the second long side wall element 2 from and to a ground on which the second long side wall element 2 stands. In exemplifying embodiment shown, the engagement means 13 comprise two spring-loaded elements that engages the underlying ground by the action of a spring (not shown), and which can be disengaged from the ground by automatic counteraction of the spring force. The underlying ground on which the second long side wall element 2 is to be displaced may comprise a base element 14, for example a concrete or metal plate which may be configured for engagement with said engagement means 13. For example, there may be provided holes or grooves in the base element 14 which the engagement means 13 are configured to engage. The engagement means 13 may be covered by a casing 15 or the like in order to prevent ambient dirt from affecting the functionality of the engagement means 13.

Figure 3:
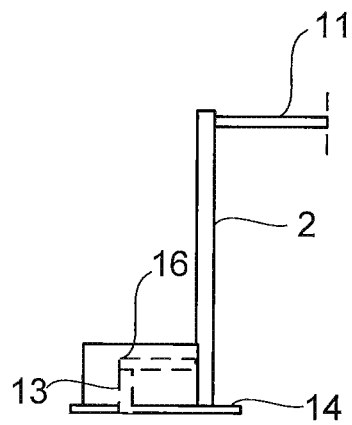
FIG. 3 is a schematic side view of the second long side wall element shown in FIG. 2

The milking stable comprises a second driving mechanism 16 (schematically shown in FIG. 3), which is configured to control the operation of said engagement means 13. The second driving mechanism 16 may be any power mechanism, such as an electric motor, or a pneumatically or hydraulically driven mechanism, the operation of which is controlled by a control unit, preferably the same control unit that is used for controlling the operation of the driving mechanism of the bridge element 11.

In the exemplifying embodiment the second driving mechanism 16 is configured to set the engagement means 13 in a disengaged position (relative to the underlying ground) when the driving mechanism of the bridge element 11 performs a change of length of the bridge element 11, thereby allowing displacement of a bottom part of the second long side wall element 2 in correspondence to the change of length of the bridge element 11, and to set the engagement means 13 in an engaged position when the first driving mechanism has finished its change of length of the bridge element 11.

The invention claimed is:

1. A milking stable configured to house one animal at a time for milking of the animal, said milking stable comprising:
    a first long side wall element;
    a second long side wall element facing opposite the first long side wall element and distanced from the first long side wall element to define a width of the milking stable, the second long side wall element being shorter than the first long side wall element;
    a first short end wall element;
    a second short end wall element facing opposite the first short end wall element;
    an entrance door hingedly connected to a first end of the second long side wall element and configured to swing away from the first short end wall element;

an exit door hingedly connected to a second end of the second long side wall element opposite said first end and configured to swing away from the second short end wall element;

a bridge element that connects the first long side wall element with the second long side wall element;

a first driving mechanism;

an engagement system configured to disengage from and engage to a ground on which the second long side wall element stands, respectively, of a bottom part of the second long side wall element;

a second driving mechanism configured to control an operation of said engagement system, the second driving mechanism being in operational connection with the first driving mechanism, the second driving mechanism being configured to control the operation of said engagement system based on information regarding an operation performed by the first driving mechanism to change the length of the bridge element, wherein the second long side wall element is displaceable in a direction perpendicular to the first long side wall element, along a path running between the first and second long side wall elements, both in a direction toward the first long side wall element and in a direction away from the first long side wall element, a length of said bridge element between said first long side wall element and said second long side wall element is adjustable, the bridge element is comprised of a first part connected to the first long side wall element, and a second part connected to the second long side wall element, wherein the first driving mechanism is configured to displace said first part relative to said second part in order to change the length of the bridge element;

the first part is configured to be displaced relative to the second part along the path running between the first and second long side wall elements in a first state, the first part and the second part being connected such that displacement of the first part relative to the second part is prevented in a second state, and the entrance door and the exit door that are hingedly connected to the second long side wall element are configured to be rotated after displacement of the second long side wall element in the direction perpendicular to the first long side wall element.

2. The milking stable according to claim 1,
wherein said first and second parts of the bridge element have at least two predetermined positions which each result in a different length of the bridge element.

3. The milking stable according to claim 1, further comprising:
a driving mechanism that is configured to displace said second part relative to said first part in order to change the length of the bridge element.

4. The milking stable according to claim 3, further comprising:
an identification system configured to identify a size of an animal in the stable,
wherein said driving mechanism is connected to said identification system and configured to change the length of the bridge element based on information generated by the identification system of the size of the animal.

5. The milking stable according to claim 1, wherein the bridge element is positioned above an expected height of animals to be milked in the stable.

6. The milking stable according to claim 1, further comprising:
an engagement system configured to disengage from and engage to a ground on which the second long side wall element stands, respectively, of a bottom part of the second long side wall element.

7. The milking stable according to claim 1, wherein the second driving mechanism is configured to set the engagement system in a disengaged position when the first driving mechanism performs the operation to change the length of the bridge element, thereby allowing displacement of the bottom part of the second long side wall element in correspondence to the change of the length of the bridge element, and to set the engagement system in an engaged position when the first driving mechanism completes the operation to change the length of the bridge element.

8. The milking stable according to claim 1,
wherein the first long side wall element forms a support structure that is configured to be permanently secured to ground, and
wherein the second long side wall element is a movable module which is mechanically supported by the first long side wall element.

9. The milking stable according to claim 1,
wherein the first long side wall element forms a support structure that is configured to be permanently secured to ground,
wherein the second long side wall element is a movable module which is mechanically supported by the first long side wall element, and
wherein the second long side wall element is supported by the first long side wall element through the bridge element.

10. The milking stable according to claim 1, further comprising:
a power cylinder having a first end and a second end, the first end of the power cylinder being connected to the first long side wall element and the second end of the power cylinder being connected to one of the entrance door and the exit door, the power cylinder configured to control a position of the one of the entrance door and the exit door.

11. The milking stable according to claim 10, wherein the power cylinder is one of a hydraulic cylinder and at least two pneumatic cylinders in series.

12. The milking stable according to claim 1, further comprising:
a device configured to automatically milk animals.

* * * * *